United States Patent [19]

Zoot

[11] 3,828,159
[45] Aug. 6, 1974

[54] LASER CUTTING SURFACE

[75] Inventor: Robert M. Zoot, West Los Angeles, Calif.

[73] Assignee: Hughes Aircraft Company, Culver City, Calif.

[22] Filed: Oct. 8, 1971

[21] Appl. No.: 187,712

Related U.S. Application Data

[63] Continuation of Ser. No. 3,665, Jan. 19, 1970, abandoned.

[52] U.S. Cl. ............ 219/121 LM, 83/167, 108/161, 219/160, 269/284
[51] Int. Cl. ............................................ B23k 27/00
[58] Field of Search .......... 219/121 L, 121 EB, 160, 219/158, 137, 136, 130; 29/283, 491, 559; 228/50; 108/24, 51, 161; 161/68; 83/658; 269/284, 296

[56] References Cited
UNITED STATES PATENTS

| | | | |
|---|---|---|---|
| 1,648,683 | 11/1927 | Herald | 219/137 |
| 2,573,115 | 10/1951 | Sisto | 99/450 |
| 2,823,460 | 2/1958 | Weiler | 161/68 |
| 2,890,883 | 6/1959 | Brookhouser | 269/296 |
| 3,226,527 | 12/1965 | Harding | 219/121 L |
| 3,612,814 | 10/1971 | Houldcroft | 219/121 L |
| 3,626,800 | 12/1971 | Newton, Jr. | 83/658 |
| 3,629,545 | 12/1971 | Graham | 219/121 L |

OTHER PUBLICATIONS

"Precise Perforations Everytime" The Tool and Manufacturing Engineer, 11/69, pp. 46–49.
"Carbon Dioxide Laser Welding" Welding Journal, 10/69, pp. 800–806.

*Primary Examiner*—J. V. Truhe
*Assistant Examiner*—George A. Montanye
*Attorney, Agent, or Firm*—W. H. MacAllister; Joseph E. Szabo

[57] ABSTRACT

A table surface upon which a workpiece is placed to be cut by a laser beam is constructed in a manner not to be affected by the laser beam and to eliminate adverse effects to the workpiece which can be caused by the setting up of standing waves and/or stray reflections from the table surface.

9 Claims, 3 Drawing Figures

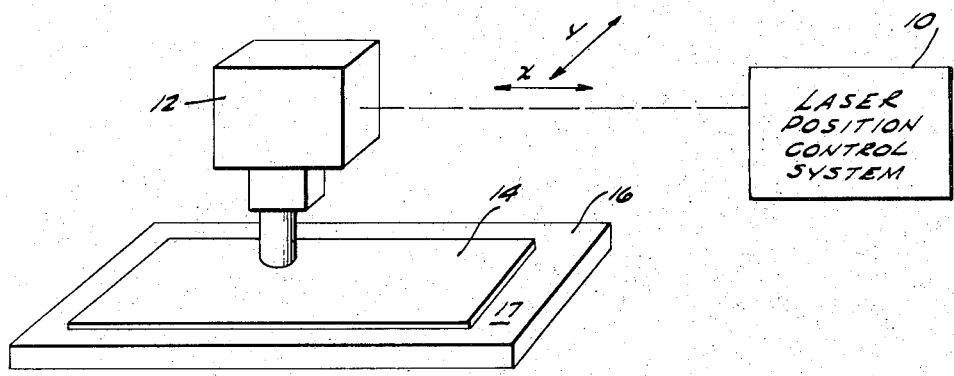
FIG. 1.
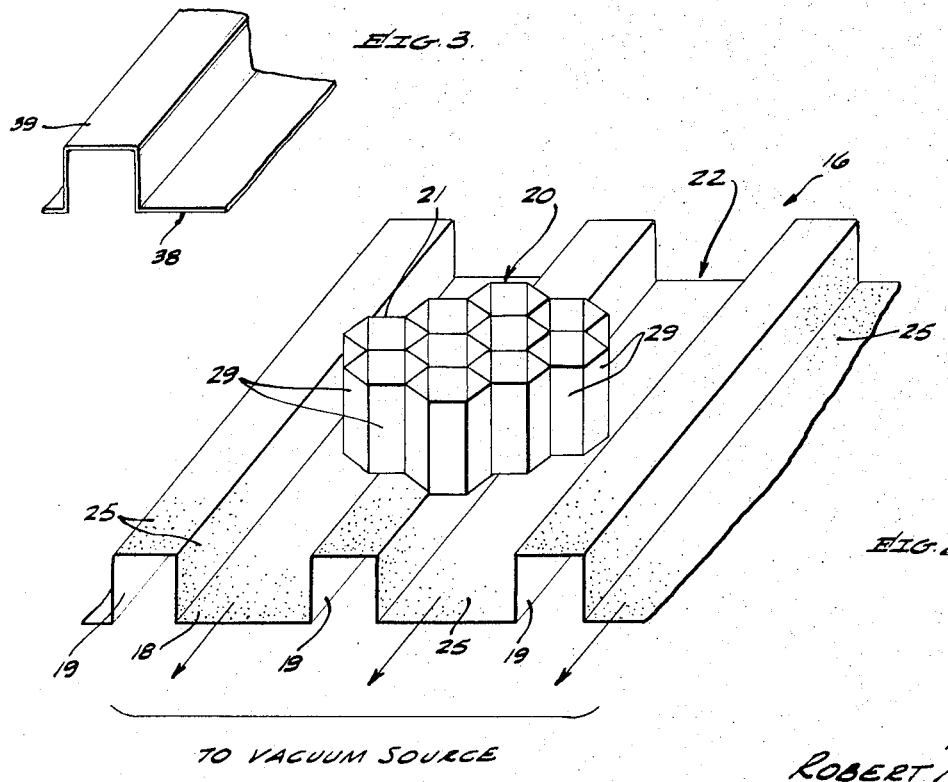
FIG. 3.
FIG. 2.
TO VACUUM SOURCE
INVENTOR.
ROBERT M. ZOOT,
BY
Joseph P. Kates
ATTORNEY.

LASER CUTTING SURFACE

This is a continuation, of application Ser. No. 3,655, filed Jan. 19, 1970, now abandoned.

BACKGROUND OF THE INVENTION

This invention relates to a table surface for supporting a workpiece which is to be cut by a laser beam and more particularly to improvements therein.

Among other applications for a laser, there has been proposed its use for cutting materials such as cloth or plastic sheets, in place of the presently known system of cutting with a power operated knife. Metal also is cut by the laser beam. Among other advantages, since the use of the laser beam eliminates mechanical contact with the material, a far faster cutting operation can be achieved. The material is placed on a table top and a laser beam having sufficient energy to burn through the material is directed at the material. The laser beam is moved in order to burn a desired pattern.

It was found however that the power requirement of the laser beam in order to achieve burning or "cutting" at reasonable speeds, was such that the table surface would be roughened or marred so that when any material is placed thereon subsequently to be cut it would not lie flat. The use of a solid thick metal table surface, such as steel or copper which could dissipate the heat and energy absorbed from the laser beam or which is polished enough so that it reflects the focused laser beam back upon itself, has a number of disadvantages sufficient to render it impracticable. The weight of the table, due to the thickness of the surface material, is such as to require a heavy support system and does not lend itself to the mobility desired for the table. The reflection of the laser beam from the surface of the table back into the system sets up standing waves in the optical path of the laser which adversely affects the laser system. Also, any stray reflections which occur from the surface plane burn holes in the material at locations other than the one desired. Where motion of the table, in the course of the cutting operation, is also desired, either for the purpose of maintaining the laser stationary and moving the table, or for making the table surface part of a conveyor belt system whereby fresh workpieces may be brought under the laser after it completes its cutting operation over a desired area, the table surfaces constructed in accordance with the technology of the prior art is not easily usable.

OBJECTS AND SUMMARY OF THE INVENTION

An object of this invention is the provision of a table surface which can be used in laser cutting operations.

Yet another object of this invention is the provision of a table surface for use in laser cutting operation that eliminates adverse effects which can be caused by the laser beam.

Yet another object of this invention is the provision of a novel and useful table surface which is not adversely affected by a high intensity energy beam.

The above and other objects of the invention may be achieved in a material supportable table surface which is comprised of spacing grid such as a honeycomb structure backed by a heat absorbing and nonreflecting material. The edges of the grid facing the surface are of magnitude of the beam spot size to prevent burning of the edges. The depth of the honeycomb is sufficient to insure at least some defocussing and the sides of the honeycomb may be reflective to provide down deflection upon radiant energy hitting them obliquely.

BRIEF DESCRIPTION OF THE DRAWINGS

FIG. 1 is a schematic view representing a system in which the present invention is employed;

FIG. 2 is an enlarged sectional view of the table of FIG. 1 constructed in accordance with this invention and illustrating a first illustrative embodiment illustrating a honeycomb grid spacing member and an aluminum backing the upper surface of which is roughened and coated with a non-reflective coating; and FIG. 3 is a fragmentary sectional view of a second illustrative embodiment wherein the backing material of the table of FIG. 2 is a non-reflective material and the surface of which is not coated.

Referring now to FIG. 1, a laser cutting system of the type in which this invention is employed is schematically represented in FIG. 1. A laser position control system 10, which may be apparatus analogous to the type used in numerical machine tool control systems, can move a laser system 12 in any desired path, such as along an X and Y axis, as represented by the arrows shown adjacent to the laser system. The laser system includes all the apparatus required for emitting a focused high density light beam at a material, such as cloth 14, which is laid on the surface 16. The surface 16 may be the top surface of a support such as a table top 17, which can be stationary or movable as desired.

By way of example, and not to be construed as a limitation on the invention, for the purpose of cutting a layer of material, such as cloth, it has been found that a focused $CO_2$ laser beam, which has up to 250 watts of power which is focused in a 0.002 inch diameter spot on the surface of the table, is required. It has been found further, that when such a spot is scanned across the surface of the table at rates as low as 1 inch per minute, the table surface, made in accordance with prior art practices, may be roughened or marred by the beam. Construction of a solid thick metal thick enough to dissipate the heat energy absorbed by the table top and/or polished enough to reflect the focused beam back upon itself produces other undesirable results, as previously mentioned.

FIG. 2 is an enlarged sectional view of a portion of the table top, shown in FIG. 1, which is constructed in accordance with this invention. It comprises a honeycomb layer 20, of a material such as aluminum honeycomb. The term honeycomb layer as defined herein is not limited to hexagonal cells but rather is used to denote a cellular or spaced baffle-like structure comprised of relatively thin walls defining a spacing grid full of cavities. A heat absorbing material backing member 22 which can absorb the heat without an adverse reaction is provided to support honeycomb layer 20. Backing member 22 comprises a plate member having flat surface portions 18 and raised ridges 19. Raised ridges 19 support the under surface of the honeycomb 20. Alternatively, a flat enclosing plate and separate honeycomb 20 supporting blocks (not shown) could be provided instead of the plate having flat surfaces 18 and ridges 19. Backing member 22 may, for example, be aluminum or asbestos or of a refractory material. To assist in the heat absorption, and also to further reduce the likelihood of adverse reflections, the material 22 surface may be roughened, and/or blackened by a coating 25 of such materials as colloidal graphite in a suspension, for example, the suspension obtainable under the name Aquadag, a trademark of the Acheson Colloids Company.

Vacuum means (not numbered) may be routed through the end surfaces (not shown) of backing member 22 in the portions between the ridges 19 to pull soot and burned portions of fabric from the honeycomb 20 and backing member 22.

Refer to FIG. 3. The heat absorbing backing 38 therein illustrated and having raised ridges 39 may be of material such as asbestos or a refractory material, the surface of which may be rough or non-reflective and not require roughening or coating. It will be appreciated, however, that such materials also where desirable may be roughened and/or coated with non-reflective material as illustrated in FIG. 2.

Refer again to FIG. 2. The edge 21 of the honeycomb 20 is of the order of width magnitude of the radiated beam striking spot to prevent the burning of the edge due to te phenomenon of edge diffraction. The depth of the honeycomb walls 27 is sufficient to insure some defocusing of the beam. The honeycomb material wall side surfaces 29 may be made reflective to facilitate reflecting down of radiation which hits the wall surfaces 29 obliquely.

By way of illustration, and not to constitute a limitation upon this invention, a suitable table surface was made of a 1 inch thick bed of aluminum honeycomb which is supported on edge. The honeycomb wall thickness is approximately 0.004 inch and the diameter of each honeycomb cell may range from one-eighth inch to one-half inch. Under the honeycomb there is placed a layer of between one-fourth inch to 1 inch thickness of an asbestos type material. This combination of honeycomb and substrate allows the laser beam to pass through its focal point at the top surface of the table, then diverge in such a way as to go through the material to be burned, which is at its focal point and be baffled down the honeycomb cells until it finally strikes the face of the asbestos material. The divergence rate of the laser beam is sufficient so that by the time the laser beam reaches the base of the asbestos material its power is spread over a sufficient area to leave the base materials substantially unaffected. The honeycomb structure itself is unmarked.

As the laser beam is scanned over the honeycomb material with its beam focused above the honeycomb or at the top surface of the honeycomb, as required by the particular application, the inter-reaction of the edge of the honeycomb material to the focus spot of the laser beam is such that it resembles the physical characteristic known as edge diffraction, by which a light beam is scattered when it passes over a sharp edge such as a knife edge. This scattering significantly reduces the amount of power which can be held focused in a small spot size. By this combination of honeycomb or other material supporting and elevating appropriately cross-sectional configuration structure and of asbestos or other appropriate heat absorbing and non-reflective material backing, the focused laser passing over the edges of the honeycomb results in a minimum of or absolutely no ill effects whatsoever to the top surface of the honeycomb. Further, the table is light enough so that it is easily moved, if required.

While honeycomb material has been stated to be aluminum, it will be obvious to those skilled in the art to make it out of other materials as well where the temperatures involved might be such as to cause problems with the aluminum. For example, the honeycomb may be made of a refractory material such as a ceramic material such as where metal is being cut in an oxidizing atmosphere. Also as stated the spacing grid may be of other type honeycomb construction, for example, an array of baffles, or mesh or other arrangement having relatively sharp edged partitions at the material supporting surface, permitting edge diffraction and spacing such as to afford the advantages provided by the invention.

There has accordingly been disclosed and shown herein a novel and useful table top suitable for use in a system wherein a cutting operation of material placed on the table top is effectuated by a laser beam focused on the table top.

What is claimed is:

1. In a laser cutter wherein a layer of material is cut by a focused laser beam directed from a source thereof at said material, the combination with said laser source of a honeycomb panel
   1. having open cells extending through said panel from its front surface to its back surface,
   2. adapted to receive said layer of material directly on said front surface,
   3. located so that said front surface faces said focused laser beam and receives said laser beam after it has penetrated said layer of material, and
   4. having a wall wedge thickness at said front surface on the order of the magnitude of the diameter of said focused laser beam at the point where it is received by said front surface, whereby said focused beam, after having penetrated said layer of material, passes harmlessly through said honeycomb panel.

2. The combination of claim 1 wherein said honeycomb panel is made of aluminum.

3. The combination of claim 1 wherein te honeycomb panel is made of a refractory material.

4. The combination of claim 1 additionally including heat absorbing material disposed adjacent the back surface of said honeycomb panel.

5. The combination of claim 34 wherein the surface of said heat absorbing material is blackened and roughened.

6. The combination of claim 4 wherein said heat absorbing material is made of aluminum and wherein said aluminum has an upper surface which is roughened and coated with a material which is substantially non-energy reflective at the wavelength of said laser beam.

7. The combination of claim 4 wherein said heat absorbing material is a refractory material.

8. The combination of claim 4 wherein said heat absorbing material is asbestos.

9. A method for supporting a layer of material being cut by a focused laser beam directed at the top surface of said layer comprising:
   laying said material upon the front surface of a honeycomb panel whose front surface faces said focused beam so as to receive said laser beam after it has penetrated said layer of material, whose cells are open at said top surface, and whose cell walls have an edge thickness on the order of the magnitude of the diameter of said focused laser beam at the point where it is received by said front surface, whereby said focused laser beam, after having penetrated said layer of material, passes harmlessly through said honeycomb panel.

* * * * *